United States Patent
Bi et al.

(10) Patent No.: US 9,769,228 B2
(45) Date of Patent: Sep. 19, 2017

(54) SYSTEM AND METHOD FOR SERVICING ONE OR MORE USER EQUIPMENTS THROUGH ONE OR MORE STREAMS

(71) Applicant: Futurewei Technologies, Inc., Plano, TX (US)

(72) Inventors: Hao Bi, Lake Zurich, IL (US); Yishen Sun, Buffalo Grove, IL (US)

(73) Assignee: Futurewei Technologies, Inc., Plano, TX (US)

( * ) Notice: Subject to any disclaimer, the term of this patent is extended or adjusted under 35 U.S.C. 154(b) by 124 days.

(21) Appl. No.: 14/692,052

(22) Filed: Apr. 21, 2015

(65) Prior Publication Data

US 2015/0304378 A1    Oct. 22, 2015

Related U.S. Application Data

(60) Provisional application No. 61/982,174, filed on Apr. 21, 2014.

(51) Int. Cl.
*H04W 4/00*    (2009.01)
*H04L 29/06*   (2006.01)
*H04W 4/06*    (2009.01)

(52) U.S. Cl.
CPC ........... *H04L 65/4076* (2013.01); *H04W 4/06* (2013.01)

(58) Field of Classification Search
CPC ............. H04L 65/4069; H04L 65/4076; H04L 65/4084; H04L 65/4092; H04L 65/60; H04L 65/601; H04L 65/602; H04L 65/604; H04L 65/605; H04W 4/06
See application file for complete search history.

(56) References Cited

U.S. PATENT DOCUMENTS

| 6,269,080 | B1 * | 7/2001 | Kumar | H04L 1/1614 370/236 |
| 6,577,599 | B1 * | 6/2003 | Gupta | H04L 12/1868 370/236 |
| 7,398,316 | B2 * | 7/2008 | Tenhunen | H04L 29/06027 348/E7.081 |
| 8,438,485 | B2 * | 5/2013 | Kulis | G06F 3/167 704/270.1 |
| 9,288,540 | B2 * | 3/2016 | Amidon | H04N 5/76 |
| 2004/0064481 | A1 * | 4/2004 | Azami | H04H 20/28 |
| 2004/0117820 | A1 * | 6/2004 | Thiemann | H04N 7/17318 725/37 |
| 2006/0242106 | A1 * | 10/2006 | Bank | G06F 17/30038 |
| 2007/0067309 | A1 * | 3/2007 | Klein | G06F 17/30017 |

(Continued)

FOREIGN PATENT DOCUMENTS

| CN | 101136814 A | 3/2008 |
| CN | 101166350 A | 4/2008 |
| EP | 2124386 A1 | 11/2009 |

*Primary Examiner* — Kevin Mew
(74) *Attorney, Agent, or Firm* — Slater Matsil, LLP (57) ABSTRACT

An embodiment method for operating a network entity servicing one or more user equipments (UEs) includes transmitting a data file through one or more streams, wherein each of the one or more streams are carried on a multiple-user accessible channel. A configuration communication is provided to the one or more UEs regarding a relationship between content of the data file and the one or more streams such that each of the one or more UEs can receive the data file at different time instances according to the configuration communication.

29 Claims, 5 Drawing Sheets

(56) References Cited

U.S. PATENT DOCUMENTS

| | | | |
|---|---|---|---|
| 2007/0199076 A1* | 8/2007 | Rensin | H04L 29/06027 726/27 |
| 2008/0133551 A1* | 6/2008 | Wensley | G06F 21/10 |
| 2009/0183205 A1* | 7/2009 | McCartie | H04L 65/60 725/56 |
| 2011/0201275 A1* | 8/2011 | Jabara | H04L 12/5692 455/41.2 |
| 2011/0275320 A1* | 11/2011 | Pattenden | H04B 17/21 455/41.2 |
| 2012/0069131 A1* | 3/2012 | Abelow | G06Q 10/067 348/14.01 |
| 2012/0089971 A1* | 4/2012 | Williams | G06F 8/61 717/167 |
| 2013/0215813 A1* | 8/2013 | Kotecha | H04L 1/0017 370/312 |
| 2013/0276034 A1* | 10/2013 | O'Hanlon | G11B 27/10 725/61 |
| 2014/0068690 A1* | 3/2014 | Luthra | H04N 21/234309 725/110 |
| 2014/0189054 A1* | 7/2014 | Snider | H04L 67/02 709/217 |

\* cited by examiner

SYSTEM AND METHOD FOR SERVICING ONE OR MORE USER EQUIPMENTS THROUGH ONE OR MORE STREAMS

This application claims the benefit of U.S. Provisional Application No. 61/982,174, filed on Apr. 21, 2014, titled "System and Method for Servicing One or More User Equipments Through One or More Streams," which is incorporated herein by reference.

TECHNICAL FIELD

The presented embodiments are related to systems and methods for wireless communications, and, in particular embodiments, to systems and methods for servicing multiple user equipments through multiple streams.

BACKGROUND

In current Long Term Evolution (LTE) systems, when multimedia broadcast multicast service (MBMS) is not in use, a download (DL) media access control (MAC) transport block (TB) in a unicast service is specific to each individual user equipment (UE.) That is, the data of a MAC TB is destined for one UE only, then multiple streams or data connections are required to service multiple UEs since each UE requires an individual connection form the network. Additionally, the physical (PHY) layer overhead in a wireless communications network associated with transferring a UE-specific MAC TB may include physical downlink shared channel (PDSCH) and physical downlink control channel (PDCCH) signaling/configuration, such as cell-radio network temporary identifier (C-RNTI), downlink control information (DCI) format, etc. Individually serviced UEs require physical layer overhead for each UE, significantly burdening a wireless communications system, particularly when the same data is being transmitted to multiple UEs MBMS supports multicast/broadcast services in a cellular system that is complementary to the traditional unicast, or individualized one-to-one service. With MBMS, the same content is transmitted to multiple users located in a specific area (MBMS service area), which typically includes multiple cells. In each cell participating in the transmission, a point-to-multipoint radio resource is configured and all users subscribing to the MBMS service simultaneously receive the same transmitted signal. No tracking of users' movements in the radio-access network is performed and users can receive the content without notifying the network. When MBMS is in use, the same MAC TB is received over multicast traffic channel (MTCH) by all UEs subscribed to the service.

SUMMARY

An embodiment method for operating a network entity servicing one or more user equipments (UEs) includes transmitting a data file through one or more streams, wherein each of the one or more streams are carried on a multiple-user accessible channel. A configuration communication is provided to the one or more UEs regarding a relationship between content of the data file and the one or more streams such that each of the one or more UEs can receive the data file at different time instances according to the configuration communication.

An embodiment method for operating a user equipment (UE) for downloading data from one or more streams includes receiving a first configuration communication from a network entity, the first configuration communication having information regarding a relationship between content of a data file and the one or more streams, and receiving a data file from the network entity through the one or more streams and in accordance with the information regarding the relationship between content of the data file and the one or more streams in the first configuration communication. The data file is received by the UE at a first time instance that is independent of a second time instance at which another UE can receive the data file.

An embodiment user equipment (UE) includes an antenna, a processor connected to the antenna and configured to transmit and receive data through the antenna, and a non-transitory computer readable medium connected to the processor. The non-transitory computer readable medium has stored thereon instructions, that when executed, cause the processor to receive a first configuration communication from a network, the first configuration communication having information regarding a relationship between content of a data file and one or more of a plurality of streams carried in multiple-user accessible channels and over which the data file is transmitted. The non-transitory computer readable medium further has stored thereon instructions, that when executed, cause the processor to receive the data file from the network in the one or more of the plurality of streams and according to parameters in the first configuration communication. The data file is received by the UE at a first time instance that is independent of a second time instance at which another UE can receive the data file.

An embodiment network element includes an antenna, a processor connected to the antenna and configured to transmit and receive data through the antenna, and a non-transitory computer readable medium connected to the processor. The a non-transitory computer readable medium has stored thereon instructions, that when executed, cause the processor to transmit a data file through one or more streams, wherein each of the one or more streams are carried on a multiple-user accessible channel, and provide first configuration communication to one or more UEs regarding the relationship between content of the data file and the one or more streams such that each of the one or more UEs can receive the data file at different time instances according to the first configuration communication.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presented embodiments are discussed in detail below. It should be appreciated, however, that the disclosed embodiments provide many applicable inventive concepts that can be embodied in a wide variety of specific contexts. The specific embodiments discussed are merely illustrative of specific ways to make and use the systems and method disclosed herein, and do not limit the scope of the embodiments.

In some wireless data transmission systems, MBMS transmissions are used to transmit data simultaneously to multiple UEs using a single transmissions channel. While MBMS is suitable for multicast service, there still are some limitations. For example, the radio resources that can be used for MBMS are limited to multicast-broadcast single-frequency network (MBSFN) subframes. Also, there is no feedback of missing packets from the UE to the network, e.g., eNB. Consequently, at the RLC layer, the data that is broadcast/multicast through MBMS has to be transferred in RLC unacknowledged mode (UM) only, and RLC acknowledged mode (AM) is not supported for MBMS radio bearers. At the MAC layer, the hybrid automatic repeat request (HARQ) transmission of the data that are broadcasted/multicasted through MBMS occurs only once in the DL direction. That is, no HARQ ACK/NACK is provided by receiving UEs and thus there are no HARQ retransmissions of the MAC TB. Further, the data is broadcast/multicast in a more pre-determined pattern, and all UEs have to follow the same timeline. Thus, neither unicast service nor MBMS service is efficient or flexible enough to support a scenario where multiple UEs of the same cell or coordinated cells begin requesting the same service or downloading the same file around similar times (not necessarily exactly the same time).

It has been discovered that a hybrid unicast/multicast service can be used to reliably provide data transmissions to multiple UEs without the requiring overhead associated with individual data transmission channels for the entirety of the data transmissions. An embodiment provides service to one or more UEs through one or more data streams by providing a system that allows for multiple-user accessible unicast channels. An embodiment provides a more flexible and efficient service that saves the system bandwidth and reduces UE file downloading time. Embodiments may be implemented in wireless networks, such as LTE-Advanced (LTE-A) communication systems, and wireless devices, such as base stations and UEs.

As described herein, some embodiments provide a system for providing a service such as file downloading, but may be used to deliver service data for streaming, media playback, data synchronization, or any other type of wireless data transfer. For example, in a large stadium sporting event, multiple viewers may want to view video replays of the sporting event, view alternative camera views, supplemental video materials, breaking news stories, commentary or the like. Similar use cases may be identified in airports, hotspots, shopping malls, or the like. In such examples, the start of the service or file download by different UEs may be quite close but not the same. It would be a waste of resources to transfer the same file over multiple air interfaces between a base station such as an evolved node B (eNB) and individual UEs. The embodiments described herein provide a hybrid unicast/multicast system by, for example, transmitting one or more files on one or more streams for reception by multiple UEs. The embodiments further provide missing data segments to individual UEs by directly transmitting the missing data to the individual UE, or directing the UE to a source for the missing data. Additionally, the transmission of the files to multiple UEs may be dynamically adjusted based on reports from the UEs, allowing the transmissions to be improved or optimized.

Figure 1:
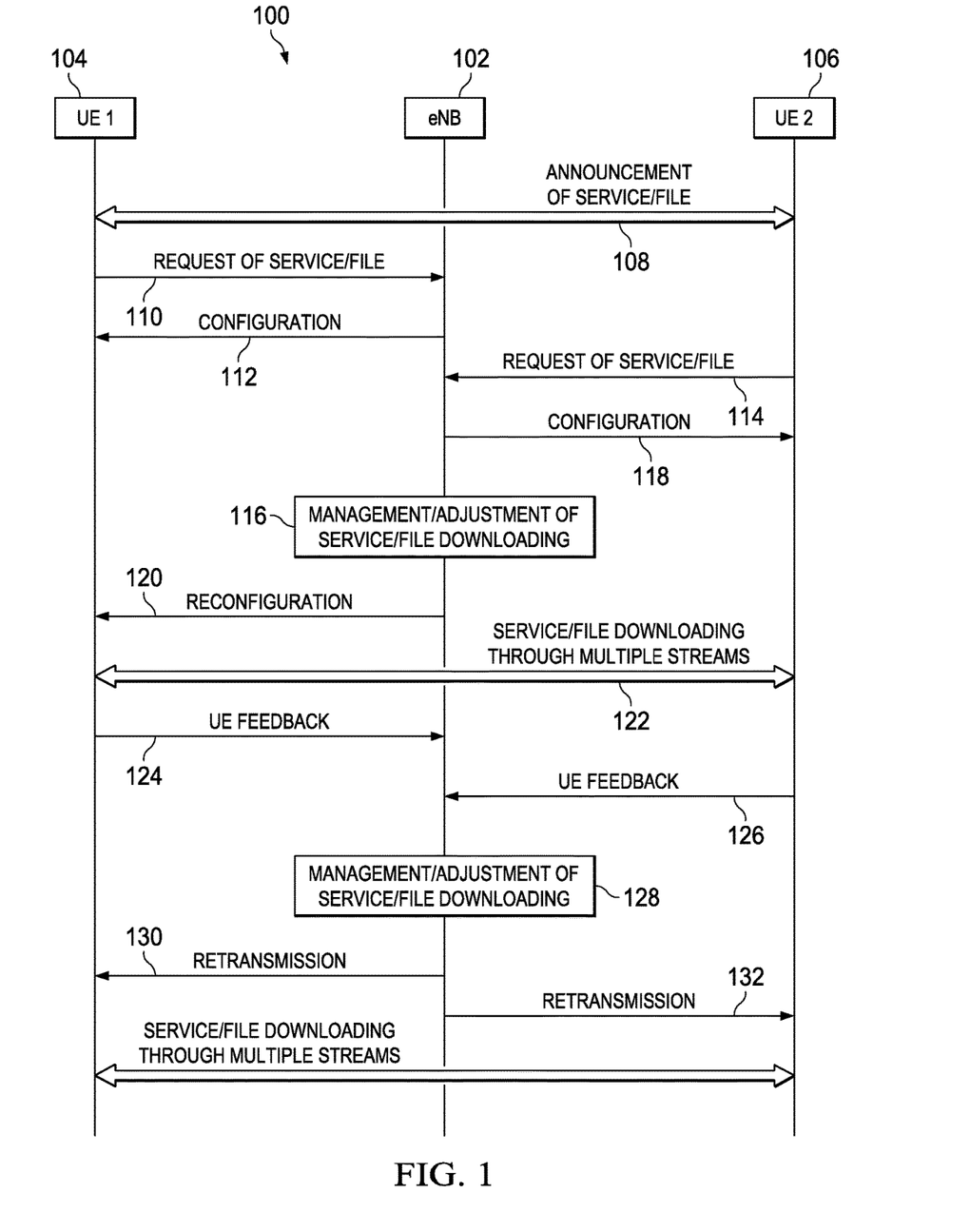
FIG. 1 is a logical diagram illustrating an embodiment of a general flow for providing data files to multiple UEs according to some embodiments.

FIG. 1 is a logical diagram illustrating an embodiment of a general flow 100 for providing data files to multiple UEs 104 and 106. This embodiment is intended to be exemplary and not limiting, as there are several possible variations of the illustrated procedures/steps. An eNB 102 is in communication with multiple UEs such as UE 1 104 and UE 2 106. In some embodiments, the UEs 104 and 106 are wireless communications devices such as cellular phones, tablets, computers, wearable devices, or the like, that are configured to communicate over a wireless interface such as LTE, WiFi, near field communication (NFC), or another wireless communications protocol.

In an embodiment, the network makes an announcement of the availability of service/file 108. In some embodiments, the service/file is file data. For example, the eNB 102 announces/broadcasts the availability of the service/file, either wirelessly or through other media. The eNB 102 may, for example, broadcast the availability of the file/service through a radio access network (RAN). In other embodiments, the network may advertise through other media, e.g., a big screen in a stadium, at a mall entrance, or the like. In yet other embodiments, the announcement of the service/file 108 may be made by publishing a web page, sending an email, text message or multimedia messaging service (MMS), or the like, that provides information regarding the service/file, and may, in some embodiments, include a selectable or clickable link that starts interaction with the network to access the service/file. Additionally, the announcement of the service/file 108 may be made once, or periodically, or may be made across multiple mediums.

In response to the announcement of the service/file 108, individual UEs 104 and 106 request the service/file at their convenience. In some embodiments, the UE 104 may send the request for the service/file 110 by submitting a response through a link provided in a web page, email, text message, or MMS. In other embodiments, the UE 104 accesses or requests the service/file through the RAN or sends a request through, for example, an attachment request, a data request, a specialized request communication, or the like, between the UE 104 and the network.

Based on one or more factors (e.g., the timing of request arrivals, the location of interested UEs 104 and 106, the length of the file), the network may determine/adapt the mechanism of file streaming/downloading to complete the service efficiently. In some embodiments, the network may initiate transmission of the service/file on one or more channels in response to the request for the service/file 110. Thus, the network may wait to begin transmission of the service/file until the first UE 104 makes the initial request for the file/service, or may determine a coding scheme or modulation scheme based on the initial request. In some embodiments, the network may initiate transmission of the service/file on one or more channels by itself automatically, or without waiting for the request for the service/file 110, and the configuration of the service/file may be transmitted to UEs through broadcast of the announcement of the service/file 108 or through unicast in the configuration communications 112 and 118.

As discussed in greater detail below, the network provides the same service/file to one or multiple UEs through one or more streams. One or more UEs 104 and 106 receive the service/file through one or more streams. With respect to the network, multiple UEs 104 and 106 receive the file/service simultaneously from the same stream, and thus system bandwidth may be saved. The UEs 104 and 106 may start listening to the file at its own preferred timing, for example, from the head of a file/stream with minimum delay. A UE 104 or 106 may also listen to multiple streams simultaneously. Thus, the download time may be shortened for the UEs 104 and 106 in both cases. The eNB 102 may be aware of which UE 104 and 106 is receiving the service/file if needed, depending on the application and business model. This knowledge of the UE 104 and 106 audience may facilitate the promotion of customer-oriented services.

The network sends a configuration communication 112 from the eNB 102 to the UE 104, for example, in response to the request for the service/file 110. In some embodiments, the network may verify that the service/file is actively being transmitted before sending the configuration communication 112, or may initiate transmission of the service/file prior to sending the configuration communication 112. In some embodiment the configuration communication 112 may be sent by the eNB 102 to UEs 104 and 106 without receiving the request for the service/file 110. For configuration of the service/file downloading, the network provides configuration information to the corresponding UE 104 and 106 on how to receive the requested service or download the requested file. The configuration information includes, in some embodiments, information associated with the stream carrying the data file, information associated with the data file and information related to the stream relationship to the data file. In some embodiments, the configuration communication 112 may comprise the parameters to derive PDCP Hyper Frame Number (HFN) and COUNT of each stream, the length of each stream, or the first and/or last COUNT or Sequence Number (SN) of the service/file data in each stream, and the list and order of streams that a UE shall listen to. The list of streams, in some embodiments, may specify the mapping of the UE to one or more streams directly, or the mapping of the UE to one or more groups which are each, in turn mapped to one or more streams. Furthermore, identifiers may be assigned to each stream/group, such as a Radio Network Temporary Identifier (RNTI) or an RLC ID. In some embodiments, the configuration communication 112 is transmitted through, for example, radio resource control (RRC) messages, MAC control elements, RLC control PDUs, PDCP control PDUs, or the like.

Thus, the file/service is made available on one or more streams that can each be accessed by multiple UEs 104 and 106. The configuration communication 112 provides the location of the stream or streams carrying desired service/file, and describes the location of a file or service data, or portions of a file, within one or more streams. Additionally, in some embodiments, the configuration communication 112 may provide information or parameters regarding the segmentation of a file across multiple streams so that file segments from multiple streams may be assembled into a final output file.

It should be understood that the file/service may be accessed at different times by different UEs 104 and 106. Thus, a second UE 106 may submit a second request for the service/file 114 that is separate from, and at a different time than, the request for the service/file 110 made by a first UE 104. The network may, in some embodiments send configuration communications 118 to a second UE 106. The second UE 106 may then start receiving the service/file at a time instance that is different from the time instance when the first UE 104 starts receiving the service/file. Thus, the first UE 104 and second UE 106 may receive a service/file from the same stream or set of streams, although the UEs 104 and 106 start at different times or time instances.

In some embodiments, the network may perform management or adjustment of service/file downloading 116 to reconfigure the provision of the service/file depending on, for example, the number, configuration, or location of UEs 104 and 106, or one or more other factors. In some embodiments, management/adjustment of the service/file downloading 116 may include, but is not limited to, one or more of tuning of specific transmission parameters, the selection or reselection of service/file sharing mechanisms, and the retransmission of certain packets, either through unicast or through multicast.

The network may, in some embodiments perform reconfiguration 120 of one or more UEs 104 and 106 after management or adjustment of the service/file downloading 116. The reconfiguration 120 may be transmitted by way of, for example, RRC messages, MAC control elements, RLC control PDUs, PDCP control PDUs or the like. The reconfiguration 120 may be in response to management or adjustment of service/file downloading 116 to override or replace a previous configuration communication 112, or to optimize the UE 104 reception of the service/file data.

After receiving the configuration communications 112 and 118, the UEs 104 and 106 download the service/file data 122 through one or more streams. In some embodiments, the streams are provided on unicast channels, for example, PDSCH. Each of the UEs 104 and 106 may receive data packets of the file in an RLC unacknowledged mode (UM), while the UEs 104 and 106 may perform acknowledgement of packets at a higher layer of the network, such as the PDCP, described in greater detail below, so that missing packets may be downloaded by way of a mechanism not limited by HARQ retransmissions.

The UEs 104 and 106 decode data from specified streams that are transmitted on channels specified in the configuration communication 112 and 118, 120. In some embodiments, the network provides service/file downloading by maintaining multiple data streams and instructing UEs to listen to the corresponding stream. The transfer of the file data through multiple streams may be a hybrid unacknowledged mode (UM)/acknowledged mode (AM) such as RLC UM/PDCP AM hybrid mode. It has been determined that such a UM/AM hybrid mode provide superior data transmission over purely UM or AM transmission mode because UE-specific RLC retransmission (retx) might not be possible when multiple UEs listen to the same stream. Additionally, PDCP AM provides the ability to enable reordering and duplicate detection as well as status reporting. Thus, the resending of packets is handled at the PDCP layer instead of the RLC layer. This allows the use of unicast streams for access by multiple UEs so that the streams are transmitted on multiple-user accessible unicast channels.

During and after the service/file downloading 122, the UEs 104 and 106 may provide UE feedback 124 to the network. In some embodiments, the UE feedback 124 is a report on the data received, missing service/file data segments, network conditions or the like. For example, the UE 104 may provide UE feedback 124 regarding the UE 104 status associated with the service/file, such as the beginning and ending sequence number of the received packets, the sequence number of missing packets, the indication of the completion of file downloading, the indication of service termination, or the like. In other examples, the UE 104 may provide a network condition report regarding channel congestion or noise, interference, received signal strength, or the like. Other UEs 106 may provide separate UE feedback 126, so that each UE 104 and 106 provides a report of the conditions regarding the specific UE.

The network may use the UE feedback 124 and 126 for management and adjustment of the service/file downloading 128. In some embodiments, the management or adjustment may include, but are not limited to, one or more of tuning of specific transmission parameters, the selection or reselection of service/file sharing mechanisms, and the retransmission of certain packets, either through unicast or through multicast. In other embodiments, the network may adjust the transmission power at the eNB 102, the channel on which each stream is transmitted, the compression or data rate of transmission, or the like.

The network may provide a retransmission communication 130 and 132 to individual UEs 104 and 106 so that the UE may receive any portions of the service/file data that were missed, corrupted, or otherwise not properly received by the UE 104 and 106. The retransmission communication 130 and 132 may include either the retransmission configuration information or the data to be recovered or both. The retransmission configuration information, in some embodiments, indicates how the missing packets are to be recovered. In some embodiments, the network may provide the retransmission of certain packets through additional stream (s) which may be accessible by either one only UE 104 or 106 or multiple UEs 104 and 106. The retransmission of missing packets may not be mandatory for the service/file downloading, and it may be done through the existing multiple stream service as well. The eNB 102 may also decide to retransmit a subset of packets of the stream depending on UE feedbacks. Thus, in an embodiment, the network may transmit an individualized message to each UE 104 and 106 based on, for example, the UE feedback 124 and 126, the time the request for the service/file 110 and 114 was received by the network, or other factors. The retransmission configuration communication 130 may have information indicating a channel on which the missing service/file data will be transmitted by unicast to the specific UE, the channels on which the streams carrying the missing data will repeat the transmission, or other information indicating the transmission parameters for recovering missing service/file data. The retransmission configuration information may be provided through RRC messages, MAC control elements, RLC control PDUs, PDCP control PDUs, or the like.

After receiving the retransmission communication 130 and 132, the UE 104 and 106 then downloads the remaining service/file data on one or more streams, or by direct communication from the network according to a configuration or instructions in the retransmission communication 130 and 132.

Figure 2A:
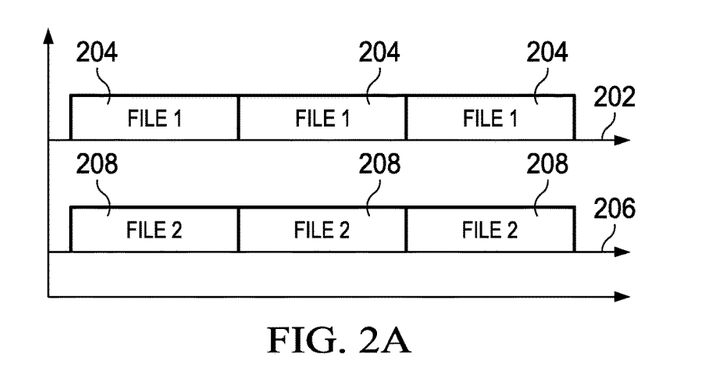
FIGS. 2A through 2C are diagrams illustrating embodiments of transmission schemes for providing data files to multiple UEs in multiple streams.
Figure 2B:
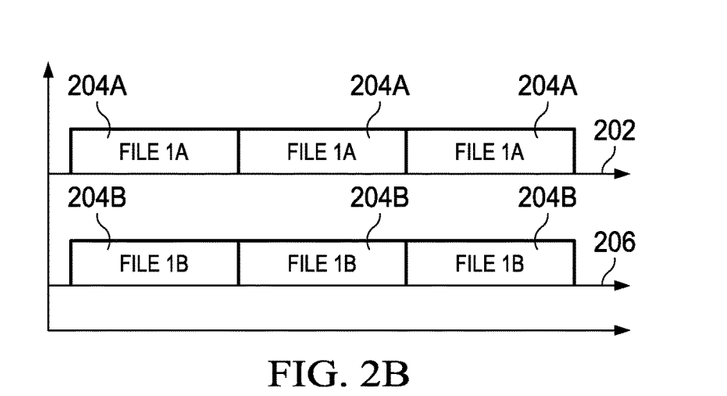
Figure 2C:
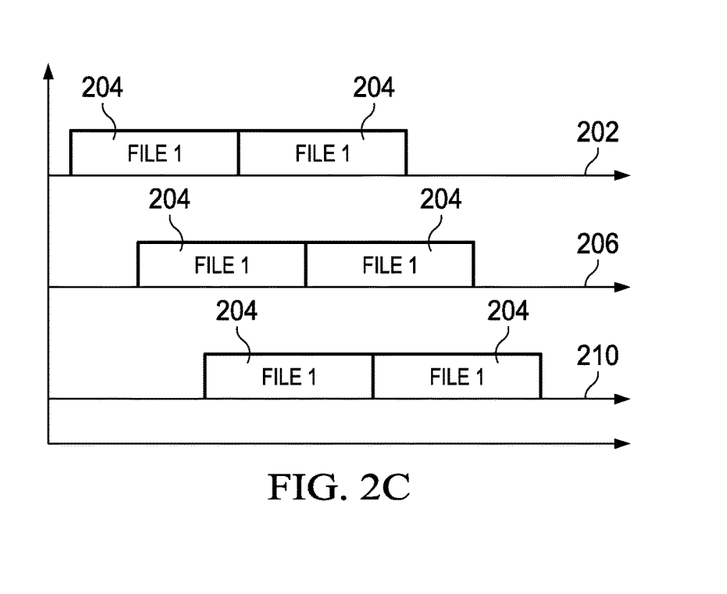

FIGS. 2A through 2C are diagrams illustrating embodiments of transmission schemes for providing data files to multiple UEs in multiple streams. In different embodiments, a file may be transmitted on one or more streams. Additionally, a file may be broken into multiple segments which are transmitted over multiple streams.

Several embodiments of service/file sharing mechanisms are described in greater detail below, but are intended to serve as examples and not to be limiting, as various service/file sharing mechanisms may be implemented in the embodiment systems and methods.

FIG. 2A is a diagram illustrating an embodiment where an eNB transmits the same file 204 through one stream 202 repetitively. With this mechanism, for the network, the same stream 202 may be received by multiple UEs simultaneously, and thus system bandwidth may be saved by permitting multiple users to download a file 204 from the same source. In some embodiments, a first file 204 is transmitted in a first stream 202, and a second file 208 is transmitted in a second stream 206. In such an embodiment, the first and second streams 202 and 206 may be transmitted on separate channels, permitting the network to offer multiple files 204 and 208 simultaneously. Additionally, the first and second files 204 and 208 are transmitted independently, and may have different lengths or file sizes, with different starting times or ending times for each of the files 204 and 208. Each of the files 204 and 208 may also be repeatedly transmitted in the respective stream 202 and 206 so that users may acquire the files 204 and 208 without requiring synchronization with the streams 202 and 206.

FIG. 2B is a diagram illustrating an embodiment where an eNB transmits file segments 204A and 204B of a file through multiple streams 202 and 206 according to some embodiments. An eNB transfers a file using multiple streams 202 and 206. Each stream 202 and 206 repeatedly transmits a file segment 204A and 204B that is a portion of an overall file.

For example, a first stream 202 repeatedly transmits a first file segment 204A that plays packets 1-100 of the file, and a second stream 206 repeatedly transmits a second file segment 204B that plays packets 101-200 of the file. The eNB directs the UEs to listen to specific streams, and the UE reassembles the file segments after the UE completes download of all the relevant file segments 204A and 204B.

With such mechanism, the same stream 202 and 206 may be received by multiple UEs simultaneously, and thus system bandwidth may be saved. For the UE, a UE may listen to multiple streams simultaneously, and thus the download time may be shortened, with the UE simultaneously downloading multiple file segments and reassembling the file from the file segments 204A and 204B.

FIG. 2C is a diagram illustrating an embodiment where an eNB transmits a file 204 through multiple streams 202, 206 and 210 according to some embodiments. Each stream 202, 206 and 210 carries the entire file repeatedly, with the file transmission start time in each stream 202, 206 and 210 offset from the file transmission start time in the other streams 202, 206, and 210. In some embodiments, the offset may be specified in terms of time or sequence number. In other embodiments, the file 204 may be transmitted on different streams using difference coding schemes, different modulation schemes, or using other varied transmission parameters.

For example, the first stream 202 transmits the entire file 204 repeatedly from time t=0, the second stream 206 transmits the entire file 204 repeatedly from t=10 s, and the third stream 210 plays the entire file 204 repeatedly from t=20 s.

In such an embodiment, the same stream 202, 206 and 210 may be received by multiple UEs simultaneously, and thus system bandwidth may be saved. For the UE, a UE may start downloading from the stream with the shortest time remaining before the start of the next file transmission. Thus, the delay of the start of download may be shortened. Additionally, if there is any missing packet, the UE may be directed to another stream to continue download or recover missing portions of the file data.

Other possible embodiments include systems where the streams are multiplexed, coded, modulated or the like. For example, content of one stream may be distributed over several sub-streams that have different modulation coding schemes (MCSs) to accommodate diversified channel conditions. Referring again to FIG. 2A, in such an embodiment, the first stream 202 may be set up to deliver a file 204 using a 64 quadrature amplitude modulation (QAM) modulation and coding scheme (MCS), while the second stream 206 may be set up to deliver a file 208 using a quadrature phase shift keying (QPSK) MCS, targeting UEs near the cell edge. In such an embodiment, the files 204 and 208 may be the same file transmitted using different MCSs, or may be different files. Those UEs initially listening to the first stream 202 may also receive, or benefit from, the second stream 206 for packets that were missed or not received correctly from the first stream 202. Similar MCS variations are applicable to other embodiments of service/file sharing mechanisms, such as the ones shown in FIG. 2B and FIG. 2C. For example, streams 202 or 206 shown in FIG. 2B may be further provided in multiple streams with different MCSs. For example, stream 202 may be shared through streams 202A, 202B and 202C. All streams 202A, 202B and 202C transmit the same file segment 204A, but the data is encoded with different MCS.

Figure 3:
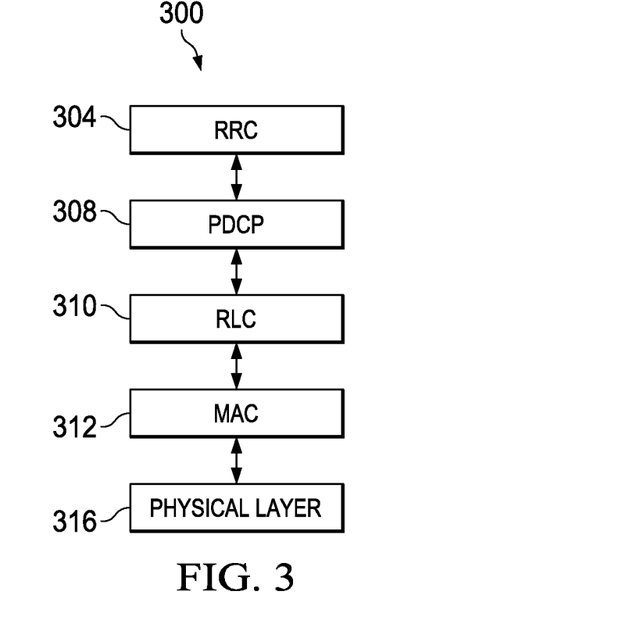
FIG. 3 is a logical diagram of a protocol stack for providing data files to multiple UEs according to some embodiments.

FIG. 3 is a logical diagram of a protocol stack 300 for UEs 320 and eNBs according to some embodiments. In some embodiments, at least a portion of the protocol stack 300 is disposed in an eNB to provide a link between a host and the UE 320. Similarly, a portion of the protocol stack may be provided in a UE to translate air interface communications into a standard message format when receiving communications at the UE 320, or to translate standard message formats into air interface communications for transmission from the UE 320.

The protocol stack 300 has a Radio Resource Control (RRC) layer 304, and includes broadcast of system information related to the access stratum (AS), paging, establishment, maintenance and release of an RRC connection between the UE and the Evolved Universal Terrestrial Radio Access Network (E-UTRAN), and security functions such as key management.

The protocol stack 300 also has, in some embodiments, non-access stratum (NAS) protocols (not shown) forming the highest stratum of the control plane between the user equipment (UE) and the Mobile Management Entity (MME). NAS protocols support the mobility of the UE and the session management procedures to establish and maintain IP connectivity between the UE and a packet data network (PDN) gateway (GW).

The RRC 304 communicates with a PDCP layer 308 in the protocol stack 300. The PDCP layer 308 is responsible for header compression and decompression of IP data, transfer of data (user plane or control plane), maintenance of PDCP Sequence Numbers (SNs), in-sequence delivery of upper layer protocol data units (PDUs) at re-establishment of a lower layer connection, duplicate elimination of lower layer service data units (SDUs), ciphering and deciphering of user plane data and control plane data, integrity protection and integrity verification of control plane data, timer based discard and duplicate discarding.

The PDCP 308 communicates with an RLC layer 310. The RLC layer 310 operates in 3 modes: Transparent Mode (TM), Unacknowledged Mode (UM), and Acknowledged Mode (AM). The RLC layer 310 is responsible for transfer of upper layer PDUs, error correction through automatic repeat request (ARQ) (in AM data transfer), and concatenation, segmentation and reassembly of RLC SDUs (in UM and AM data transfer). The RLC layer 310 is also responsible for re-segmentation of RLC data PDUs (in AM data transfer), reordering of RLC data PDUs (in UM and AM data transfer), duplicate detection (in UM and AM data transfer), RLC SDU discard (in UM and AM data transfer), RLC re-establishment, and protocol error detection (in AM data transfer).

The RLC 310 communicates with a Medium Access Layer (MAC) 312. The MAC layer 312 is responsible for mapping between logical channels and transport channels, multiplexing of MAC SDUs from one or different logical channels onto transport blocks (TB) to be delivered to the physical layer on transport channels, de multiplexing of MAC SDUs from one or different logical channels from TBs delivered from the physical layer on transport channels, scheduling information reporting, error correction through HARQ, priority handling between UEs by means of dynamic scheduling, priority handling between logical channels of one UE, and logical channel prioritization.

A physical layer 316 carries information from the MAC 318 transport channels over the air interface. The physical layer 316 handles the link adaptation (AMC), power control, cell search (for initial synchronization and handover purposes) and other measurements (inside the LTE system and between systems) for the RRC layer 304.

Figure 4:
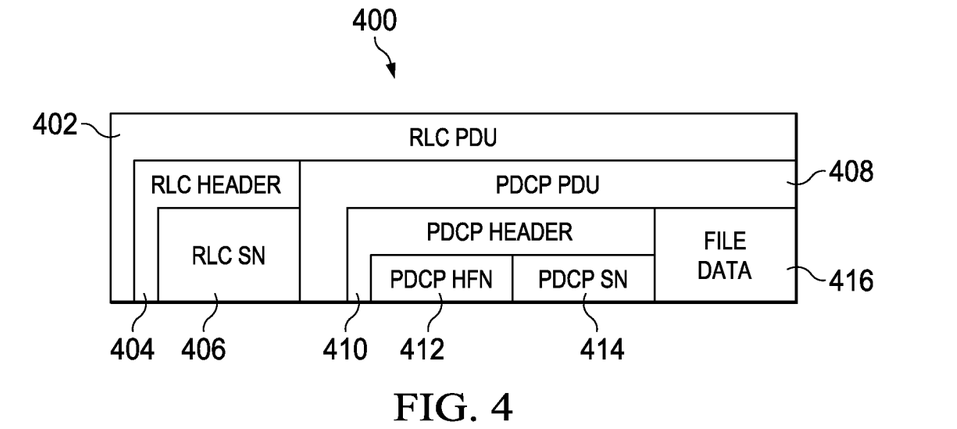
FIG. 4 is a logical diagram of a transmission packet for providing data files to multiple UEs according to some embodiments.

FIG. 4 is a logical diagram of a transmission packet 400 for providing data files to multiple UEs according to some embodiments. In some embodiments, transmission of service/file data 416 is performed using a hybrid transmission mode such as an RLC UM/PDCP AM transmission. That is, a receiving UE may receive data in an RLC unacknowledged mode, but the PDCP handles re-sending of missing data. The RLC UM transmission does not require a response from the receiving UE, but includes a header in the RLCP PDU so that the order of packets may be tracked. Such an unacknowledged mode permits broadcasting of a file stream to multiple UEs without the need to track responses from each receiving UE. Additionally, the RLC unacknowledged mode prevents the need to stop transmitting a particular stream if any of the UEs requires retransmission of missing packets. The PDCP handles delivery of missing packets, as discussed above, by setting up a retransmissions channel after the UE ends the download of the initial stream data, or by directing the UE to a stream where the missing data may be acquired.

In some embodiments, the transmission packet 400 comprises file data 416 disposed in a PDCP PDU 408 having a PDCP header 410. The PDCP header 410 has a PDCP HFN 412 and PDCP SN 414. The PDCP PDU 408 is wrapped in an RLC PDU 402 having an RLC header 404. The RLC header has an RLC SN 406. In some embodiments, the RLC SN 406 is stream specific, and PDCP SN 406/HFN 412/COUNT may be file specific. The PDCP HFN 412 and PDCP SN 414 may be used to derive a PDCP COUNT. Thus, the RLC SN 406 may be used to order packets that have been downloaded from each stream, and the PDCP SN 406/HFN 412/COUNT may be used to order packets from different streams of the file, or to order recovered missing packets into the file data received in the initial download.

Figure 5:
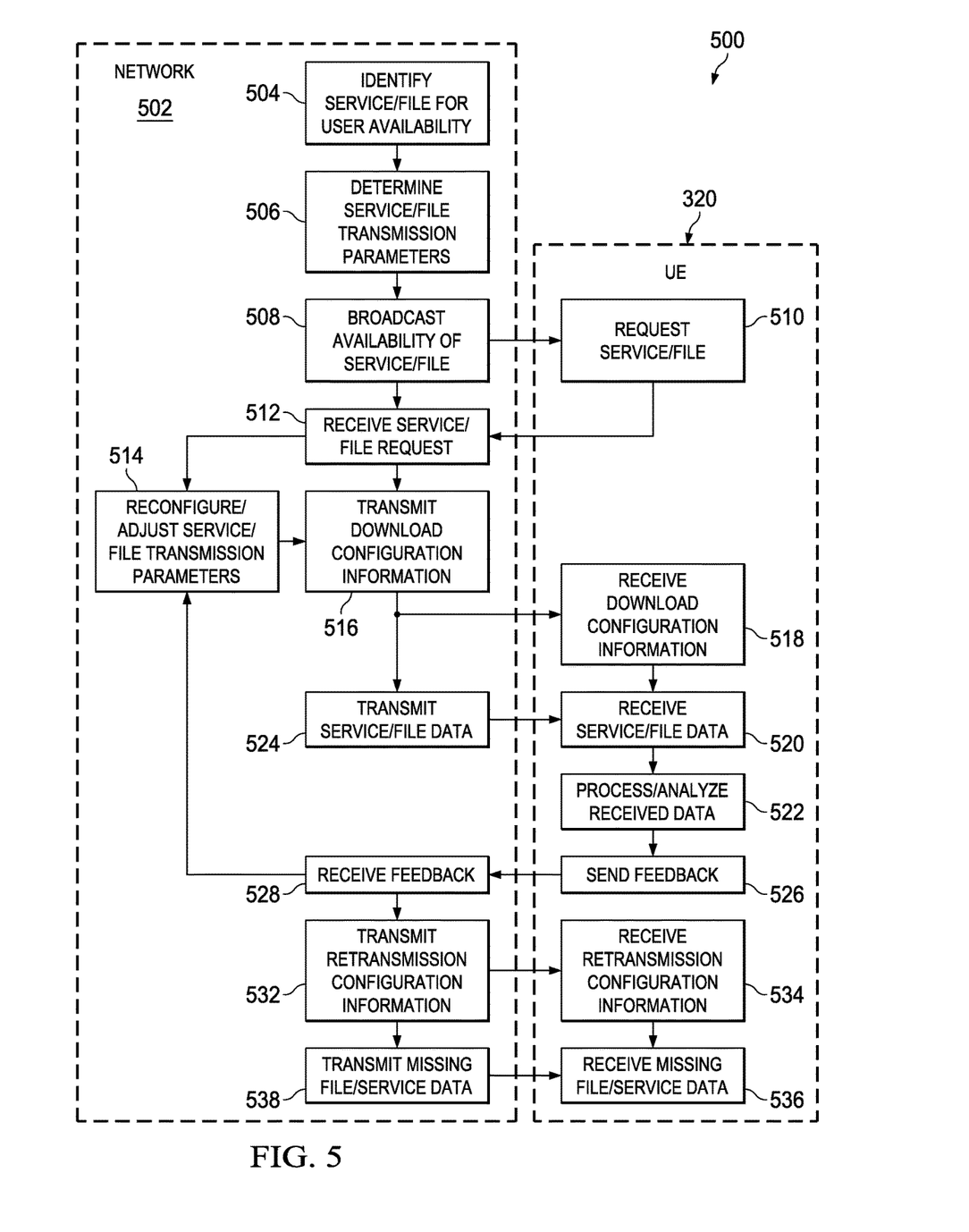
FIG. 5 is a flow diagram illustrating a method for providing data files to multiple UEs according to some embodiments.

FIG. 5 is a flow diagram illustrating a method 500 for providing data files by a network 502 to multiple UEs 320 according to some embodiments. In block 504 a service/file to be made available to users is identified. In some embodiments, the network 502 has an interface permitting a network operator to select service/files that will be transmitted to users according to the embodiments. For example, a user interface at a terminal on the network 502 may permit a network operator to select video segments from cameras in an arena, post news clips, or make streams such as social network streams, sports commentary, interactive services or the like. The network 502 then determines file/service transmission parameters in block 506. In some embodiments the network determines that the selected service/file will be transmitted repeatedly on a single stream, for example, as described above with respect to FIG. 2A. The network 502 may alternatively determine that the selected service/file will be segmented, with multiple file segments transmitted on separate streams, for example, as described above with respect to FIG. 2B, or that the selected stream/file will be transmitted on multiple streams with offset transmission start times, for example, as described above with respect to FIG. 2C. When segmenting the file, the network 502 may consider the length of each stream, and which length may result in acceptable retransmission delay of each packet. Additionally, the length of each stream may result in the potential confusion of SN wrap-around, and thus, in some embodiments, to simplify the design, it may be preferable to limit the stream length to no more than PDCP SN space. For example, where the PDCP SN is 15 bits, the length of a stream or a file segment in a stream may be $2^{15}$ bits. Alternatively, the PDCP SN field may be extended to have the same 32 bit length as the COUNT field. Thus, the network may determine that a file needs to be segmented if the file length or stream length exceeds a predetermined threshold, which, in some embodiments is $2^{15}$ bits.

Additionally, the determination of the file/service transmission parameters includes, in some embodiments, the setup of the announcement the availability of the service/file. For example, when a video clip replay at a sporting event is selected as the available file/service, a video notification announcing the service/file availability may be generated. In some embodiments, the network may generate data for transmission over the network to notify the UE directly of availability of the service/file, or a web page may be generated updated to reflect the availability of the service/file.

The availability of the file/service is broadcast in block 508. For example, the data generated in response to the determination of the file/service is broadcast or displayed. The user then requests the service/file in block 510. The request for the service/file may, in some embodiments, may be the selection of an option presented on a UE 320, the automatic selection of the service/file by the UE 320, navigation to an identified resource by the user or the UE 320, such as clicking a link, or the like. The UE 320 transmits the request for the service/file to the network, and the network 502 receives the service/file request in block 512. In some embodiments, the network 502 reconfigures or adjusts file/service transmission parameters in block 514, and then transmits download configuration information to the UE 320 in block 516. In some embodiments, the file/service transmission parameters may be configured, adjusted or reconfigured according to the number, configuration, or location of UEs 320, number of existing or anticipated service/file transmission streams, network performance, or one or more other factors. In some embodiments, the network 502 may tune/adjust specific transmission parameters, reallocate network resources, select or modify service/file sharing mechanisms, or retransmit one or more packets. The download configuration information may be a configuration communication indicating the parameters which the UE may use to receive the service/file. For example, the download configuration information may comprise one or more of a resource location, channel, frequency, file identifier, coding scheme, file structure, PDCP HFN/SN, RLC SN or file reassembly instructions for the data to be downloaded. The UE 320 receives the download configuration information in block 518 and prepares to receive the service/file data. While the transmission of download configuration information in block 516 is shown as after receiving the service file request in block 512, it is also possible, in other embodiments that the transmission of download configuration information occurs before receiving service file request in block 512, for example, together with the step of broadcast availability of service/file in block 508.

The network 502 transmits the service/file data in block 524 according to the service/file transmission parameters. In some examples, the transmission of the service/file data is initiated or modified in response to the UE requesting the service/file. In other examples, the process of transmitting the service/file data may start prior to the UE 320 requesting the service/file data, in response to other UEs 320 requesting the file at an earlier time. In such an example, the network 502 may maintain the transmission of the service/file data while the UE downloads the data.

Each stream may have multiple copies of a specified service/file or service/file segment so that the service/file data or segment data are repeatedly transmitted, and the transmission may be repeated until the eNB or UE terminates or releases the stream. Triggers for the stream release by the eNB may include, but are not limited to, expiration of a timer, all UEs 320 receiving the service/file data acknowledging the successful reception of all packets of the stream, or the like. Triggers for the stream release by UE may include, but are not limited to, the application layer informs PDCP that it is no longer necessary to listen to the stream, the eNB's configuration, the UE receiving an end marker, or the PDCP being able to combine the reception of multiple streams into one stream.

The UE 320 downloads the service/file data in block 520 by wirelessly receiving the data according to the download configuration information. In some embodiments, the UE 320 begins the download as soon as the download configuration information is received and processed, and in other embodiments, the UE 320 may wait for the beginning of the next full service/file transmission in the stream. The UE 320 may continue downloading the service/file data until the transmission reaches the end of the service/file data in the stream, until the UE acquires all of the data in the service/file, until the UE 320 has downloaded the service/file data from one or more full service/data transmissions, or the like. For example, the UE 320 may start downloading service/file data at a first point in the middle of a particular service/file transmission, and may continue downloading the service/file data in a subsequent service/file transmission so that the UE 320 has the opportunity to receive all of the service/file data packets.

An end marker may be used to indicate the end of the service/file in the stream, although it is not mandatory. The end marker permits the UE 320 to terminate a stream autonomously, report missing PDCP PDUs to the eNB at the end of the file, send out a completion notification, and submit data to the application layer on the network 502 at the end of the file, if configured to do so, even if there are missing packets. The end marker may also be used to reset the PDCP HFN and/or PDCP SN. The UE 320 may indicate to the network 502, through the eNB, the completion of downloading a stream through a PDCP control PDU, a message that the max COUNT was received, or through an RRC message.

In block 522, the UE 320 processes and analyzes the received service/file data. In some embodiments, the UE 320 reassembles service/file segments downloaded from multiple streams. Additionally, the UE 320 orders the data according to the PDCP HFN/SN/COUNT and compares the PDCP HFN/SN/COUNT to the download configuration data to verify that the service/file was received correctly, and to determine whether any of the expected service/file data is missing.

In block 526, the UE 320 submits feedback to the network regarding the downloaded data. In some embodiments, if the UE 320 determines that all of the service/file data correctly, with no missing packets or data, the UE 320 submits a message to the network 502 indicating that the service/file data download is complete. In some embodiments, the completion message indicates that the network 502 may release or discontinue transmission of the stream. If the UE determines that the service/file data download is incomplete, for example, where packets are missing from the service/file data, or where the data is corrupted or otherwise unusable, the UE 320 submits a message to the network 502 indicating that the service/file data download is incomplete. In some embodiments, the message indicating the incomplete download indicates missing service/file segments, frames, packets, or the like. The feedback may also comprise data regarding the network conditions such as channel congestion or noise, interference, received signal strength, or the like. The UE 320 may submit reporting data regarding each stream to the application layer separately, or may submit data in sequence after combining multiple streams, according to the network configuration.

The network 502 receives the feedback in block 528, and in some embodiments, may reconfigure or adjust the service/file transmission parameters in block 514 according to the feedback from the UE 320. For example, the network 502 may terminate transmission of one or more streams, reallocate network resources to improve transmission parameters, switch between transmission of streams or groups of streams, or the like. In some embodiments, multiple RLCs are associated/linked to one PDCP. The switching between streams/groups may or may not be necessary, since the network may replace one stream with another because the resource allocation for a stream is virtual. In addition, the switching can be autonomous (in response to the end packet and/or all packets being received), through a PDPC control PDU, or an RRC message.

In response to the network receiving the feedback in block 528, the network may transmit retransmission reconfiguration information in block 532. In some embodiments, the reconfiguration information comprises instructions for downloading missing service/file data.

In some embodiments, the network 502 transmits the missing file/service data in block 538. The transmission of the missing file/service data is performed according to the retransmission reconfiguration information. The missing service/file data may be acquired by the UE 320 through a stream by downloading missing packets from the same stream or from another stream. In other embodiments, the missing data may be unicast by the network 502 to the UE 320 by setting up a separate channel for transmitting the missing service/file data. For example, the network 502 may determine that a service/file that is being transmitted on a first stream will retransmit the missing packets within an acceptable time window, and may instruct the UE 320 to listen to that stream. This may be particularly useful where a service/file is short and repeats relatively frequently, or where the file is being transmitted over multiple streams with different starting time offsets. Additionally, the stream for retransmission may have different transmission parameters, such as coding scheme, compression, signal strength, carrier frequency, or the like, permitting the network to improve the reception efficiency for a particular UE 320.

In other embodiments, the network 502 may determine that the existing streams would not provide the needed data within an acceptable time window, for example, when data from widely separate locations in the data file are missing, requiring long waits between the streams transmitting the missing data. In such an embodiment, the network 502 may direct the UE 320 to a particular unicast channel over which the missing data is targeted at the UE 320.

In block 534, the UE 320 receives the retransmission configuration information and receives the missing file/service data in block 536 according to the transmission configuration information. The UE 320 may then integrate the retransmitted data into the originally received service/file data to generate the desired data file. The UE 320 may then subsequently save the file, present it to a user, or the like.

In some embodiments, the UE 320 may make multiple attempts to receive the service/file data, and may report the feedback after each attempt. Thus, the method 500 is not limited to a single attempt to retrieve missing data. Additionally, the network 520 may, in some embodiments, determine that the UE 320 needs to restart an attempted service/file retrieval, for example, when a file becomes corrupted, or when the UE 320 fails to successfully complete a specified number of attempts to receive missing data fail. In some embodiments, blocks 532, 534, 536 and 538 are optional steps of the method. That is, the network 502 may or may not retransmit missing file/service data that UEs 320 indicate in the feedback. The network 502 may decide not to retransmit certain data if, for example, it decides that the data is not critical to recover.

Figure 6:
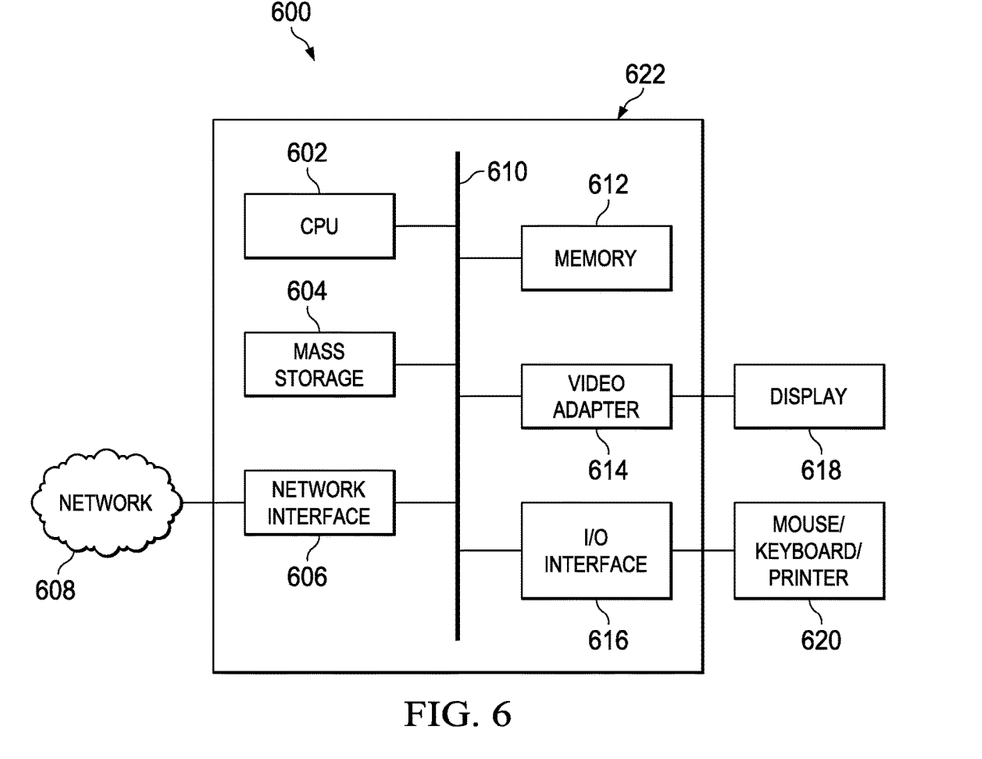
FIG. 6 is a system diagram illustrating a computing platform that may be used for implementing, for example, the devices and methods described herein, according to an embodiment.

FIG. 6 is a block diagram of a processing system 600 that may be used for implementing the devices and methods disclosed herein. Specific devices may utilize all of the components shown, or only a subset of the components, and levels of integration may vary from device to device. Furthermore, a device may contain multiple instances of a component, such as multiple processing units 622, processors 602, memories 612, transmitters, receivers, etc. The processing system 600 may comprise a processing unit 622 equipped with one or more input/output devices, such as a speaker, microphone, touchscreen, keypad, mouse/keyboard/printer 620, display 618, and the like. The processing unit 622 may include a central processing unit (CPU) 602, memory 612, a mass storage device 604, a video adapter 614, and an I/O interface 616 connected to a bus 610.

The bus 610 may be one or more of any type of several bus architectures including a memory bus or memory controller, a peripheral bus, video bus, or the like. The CPU 602 may comprise any type of electronic data processor. The memory 612 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 612 may include ROM for use at boot-up, and DRAM for program and data storage for use while executing programs.

The mass storage device 604 may comprise any type of non-transitory storage device configured to store data, programs, and other information and to make the data, programs, and other information accessible via the bus. In some embodiments, the mass storage device may have stored thereon instructions for causing the CPU 602 to perform the method steps described above. The mass storage device 604 may comprise, for example, one or more of a solid state drive, hard disk drive, a magnetic disk drive, an optical disk drive, or the like.

The video adapter 614 and the I/O interface 616 provide interfaces to couple external input and output devices to the processing unit 622. As illustrated, examples of input and output devices include the display 618 coupled to the video adapter 614 and the mouse/keyboard/printer 620 coupled to the I/O interface 616. Other devices may be coupled to the processing unit 622, and additional or fewer interface cards may be utilized. For example, a serial interface such as Universal Serial Bus (USB) (not shown) may be used to provide an interface for a printer.

The processing unit 622 also includes one or more network interfaces 606, which may comprise wired links, such as an Ethernet cable or the like, and/or wireless links to access nodes or different networks. The network interface 606 allows the processing unit to communicate with remote devices via the networks 608. For example, the network interface 606 may provide wireless communication via one or more transmitters/transmit antennas and one or more receivers/receive antennas, or by one or more antennas and a transceiver. In an embodiment, the processing unit 622 is coupled to a local-area network or a wide-area network for data processing and communications with remote devices, such as other processing units, the Internet, UEs, remote storage facilities, or the like. In other embodiments, the processing system is a UE and ne the network interface is a transceiver with an antenna and permits the processing unit 622 to wirelessly communicate through an eNB with a network.

An embodiment method for operating a network entity servicing one or more user equipments (UEs) includes determining transmission parameters for transmission of a data file through one or more streams according to at least properties of the data file and the one or more UEs and transmitting the data file through the one or more streams according to the transmission parameters. Each of the one or more streams are carried on a multiple-user accessible channel and each of the one or more UEs can begin receiving the data file at different time instances.

An embodiment method for operating a network entity servicing one or more user equipments (UEs) includes transmitting a data file through one or more streams, wherein each of the one or more streams are carried on a multiple-user accessible channel. A configuration communication is provided to the one or more UEs regarding a relationship between content of the data file and the one or more streams such that each of the one or more UEs can receive the data file at different time instances according to the configuration communication.

In an embodiment, the method further comprises broadcasting availability of the data file.

In an embodiment, the method further includes receiving one or more requests from the one or more UEs for the data file.

In an embodiment, the transmitting the data file includes transmitting the data file through a plurality of streams, wherein each of the plurality of streams repeatedly transfers a segment of the file.

In an embodiment, the transmitting the data file includes transmitting the data file through a plurality of streams, wherein each of the plurality of streams repeatedly transfers an entirety of the data file, and wherein each of the plurality of streams transfers the data file with a different starting offset.

In an embodiment, the transmitting the data file includes sending the data file through a plurality of streams, wherein each of the plurality of streams repeatedly transfers an entirety of the file with a different modulation and coding scheme.

In an embodiment, the method further includes receiving feedback from the one or more UEs related to downloading of the data file by the one or more UEs.

In an embodiment, the method further includes providing configuration information related to retransmitting data to a first UE of the one or more UEs in response to the feedback from the first UE indicating that the data file is incomplete, and transmitting at least some missing portions of the data file to the first UE.

An embodiment method for operating a user equipment (UE) for downloading data from one or more streams includes receiving a first configuration communication from a network entity, the first configuration communication having information regarding a relationship between content of a data file and the one or more streams, and receiving a data file from the network entity through the one or more streams and in accordance with the information regarding the relationship between content of the data file and the one or more streams in the first configuration communication. The data file is received by the UE at a first time instance that is independent of a second time instance at which another UE can receive the data file.

In an embodiment, the method further includes sending a request for the data file to the network entity prior to the receiving the first configuration communication.

In an embodiment, the method further includes processing the received data file to determine whether the data file has missing portions, and providing feedback to the network entity regarding the receiving the data file, the feedback comprising, in response to determining that the data file has missing portions, information regarding the missing portions.

In an embodiment, the method further includes receiving a second configuration communication related to retransmitting data in response to the providing the feedback and in response to the data file having missing portions. At least some of the missing portions are received according to the second configuration communication.

In an embodiment, at least some of the missing portions are received from the network in a unicast transmission.

In an embodiment, at least some of the missing portions are received from a transmission of the data file on a stream accessible to multiple users.

In an embodiment, the data file is received through at least one stream of a plurality of streams, wherein each of the plurality of streams repeatedly transfers a segment of the file.

In an embodiment, the data file is received through at least one of a plurality of streams, and each of the plurality of streams transfers the data file with a different starting offset.

In an embodiment, the data file is received through at least one of a plurality of streams, and each of the streams is transmitted on a multiple-user accessible channel.

An embodiment user equipment (UE) includes an antenna, a processor connected to the antenna and configured to transmit and receive data through the antenna, and a non-transitory computer readable medium connected to the processor. The non-transitory computer readable medium has stored thereon instructions, that when executed, cause the processor to receive a first configuration communication from a network, the first configuration communication having information regarding a relationship between content of a data file and one or more of a plurality of streams carried in multiple-user accessible channels and over which the data file is transmitted. The non-transitory computer readable medium further has stored thereon instructions, that when executed, cause the processor to receive the data file from the network in the one or more of the plurality of streams and according to parameters in the first configuration communication. The data file is received by the UE at a first time instance that is independent of a second time instance at which another UE can receive the data file.

In an embodiment, the non-transitory computer readable medium further has stored thereon instructions, that when executed, cause the processor to send a request for the data file to a network through the antenna.

In an embodiment, the non-transitory computer readable medium further has stored thereon instructions, that when executed, cause the processor to receive the first configuration communication from the network in response to the request for the data file.

In an embodiment, the non-transitory computer readable medium further has stored thereon instructions, that when executed, cause the processor to process the received data file to determine whether the data file has missing portions.

In an embodiment, the non-transitory computer readable medium further has stored thereon instructions, that when executed, cause the processor to provide feedback to the network regarding the receiving the data file, the feedback comprising, in response to the data file having missing portions, information regarding the missing portions.

In an embodiment, the instructions for causing the processor to receive the data file from the network in one or more of a plurality of streams include instructions for causing the processor, when executed, to perform at least one of receiving the data file through the plurality of streams, wherein each of the plurality of streams repeatedly transfers a segment of the file, receiving the data file through at least one of the plurality of streams, wherein each of the plurality of streams repeatedly transfers an entirety of the data file, and wherein each of the plurality of streams transfers the data file with a different starting offset, and receiving the data file through at least one a plurality of streams, wherein each of the plurality of stream repeatedly transfers an entirety of the file with a different modulation and coding scheme.

In an embodiment, the non-transitory computer readable medium further has stored thereon instructions, that when executed, cause the processor to receive a second configuration communication in response to the data file having missing portions and receive the missing portions according to the second configuration communication. At least some of the missing portions are received from the network in one of a unicast transmission and a transmission of the data file on a stream accessible to multiple users.

An embodiment network element includes an antenna, a processor connected to the antenna and configured to transmit and receive data through the antenna, and a non-transitory computer readable medium connected to the processor. The a non-transitory computer readable medium has stored thereon instructions, that when executed, cause the processor to transmit a data file through one or more streams, wherein each of the one or more streams are carried on a multiple-user accessible channel, and provide first configuration communication to one or more UEs regarding the relationship between content of the data file and the one or more streams such that each of the one or more UEs can receive the data file at different time instances according to the first configuration communication.

In an embodiment, the non-transitory computer readable medium further has stored thereon instructions, that when executed, cause the processor to broadcast availability of the data file.

In an embodiment, the non-transitory computer readable medium further has stored thereon instructions, that when executed, cause the processor to receive one or more requests from the one or more UEs for the data file.

In an embodiment, the non-transitory computer readable medium further has stored thereon instructions, that when executed, cause the processor to receive feedback from the one or more UEs, related to downloading of the data files by the one or more UEs.

In an embodiment, the non-transitory computer readable medium further has stored thereon instructions, that when executed, cause the processor to transmit a second configuration communication to a first UE of the one or more UEs in response to the feedback from the first UE indicating that the data file is incomplete, and transmit at least some of the missing portions of the data file to the first UE in one of a unicast transmission and a transmission of the data file on a stream accessible to multiple users.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a network entity servicing user equipments (UEs) comprising:
    transmitting, by the network entity, a data file through one or more streams to a plurality of UEs, wherein each of the one or more streams are carried on a multiple-user accessible channel, wherein a first stream in the one or more streams comprises multiple copies of at least one portion of the data file so that the at least one portion of the data file is transmitted repeatedly in the first stream and the plurality of UEs are able to receive the at least one portion of the data file without the need to synchronize with the first stream; and
    providing a configuration communication to the plurality of UEs regarding a relationship between content of the data file and the one or more streams such that each of the plurality of UEs can receive the data file at different time instances according to the configuration communication.

2. The method of claim 1, further comprising:
    broadcasting availability of the data file.

3. The method of claim 1, further comprising:
    receiving one or more requests from the plurality of UEs for the data file.

4. The method of claim 1, wherein the transmitting the data file comprises transmitting the data file through a plurality of streams, wherein each of the plurality of streams comprises multiple copies of a segment of the data file so that the segment is transmitted in a corresponding stream repeatedly.

5. The method of claim 1, wherein the transmitting the data file comprises transmitting the data file through a plurality of streams, wherein each of the plurality of streams comprises multiple copies of an entirety of the data file so that the entirety of the data file is transmitted in a corresponding stream repeatedly, and wherein each of the plurality of streams transfers the data file with a different starting offset than one another.

6. The method of claim 1, wherein the transmitting the data file comprises sending the data file through a plurality of streams, and wherein each of the plurality of streams comprises multiple copies an entirety of the data file so that the entirety of the data file is transmitted in a corresponding stream repeatedly, and each of the plurality of streams transfers the entirety of the data file with a different modulation and coding scheme than one another.

7. The method of claim 1, further comprising:
receiving feedback from a first UE in the plurality of UEs related to downloading of the data file by the first UE.

8. The method of claim 7, further comprising:
providing configuration information related to retransmitting data to the first UE of the plurality of UEs in response to the feedback from the first UE indicating that the data file is incomplete; and
transmitting at least some missing portions of the data file to the first UE.

9. A method for operating a user equipment (UE) for downloading data from one or more streams comprising:
receiving, by the UE, a first configuration communication from a network entity, the first configuration communication having information regarding a relationship between content of a data file transmitted to a plurality of UEs and the one or more streams for the UE to download the data file; and
receiving the data file from the network entity through the one or more streams and in accordance with the information regarding the relationship between the content of the data file and the one or more streams in the first configuration communication, wherein a first stream in the one or more streams comprises multiple copies of at least one portion of the data file so that the at least one portion of the data file is transmitted repeatedly in the first stream and the plurality of UEs are able to receive the at least one portion of the data file without synchronizing with the first stream; and
wherein the data file is received by the UE at a first time instance that is independent of a second time instance at which another UE can receive the data file.

10. The method of claim 9, further comprising sending a request for the data file to the network entity prior to the receiving the first configuration communication.

11. The method of claim 9, further comprising:
processing the received data file to determine whether the data file has missing portions; and
providing feedback to the network entity regarding the receiving the data file, the feedback comprising, in response to determining that the data file has the missing portions, information regarding the missing portions.

12. The method of claim 11, further comprising receiving a second configuration communication related to retransmitting data in response to the providing the feedback and in response to the data file having the missing portions; and
wherein at least some of the missing portions are received according to the second configuration communication.

13. The method of claim 12, wherein at least some of the missing portions are received from the network entity in a unicast transmission.

14. The method of claim 12, wherein at least some of the missing portions are received from a transmission of the data file on a stream accessible to multiple users.

15. The method of claim 9, wherein the data file is received through at least one stream of a plurality of streams, wherein each of the plurality of streams comprises multiple copies of a segment of the data file so that the segment is transmitted in a corresponding stream repeatedly.

16. The method of claim 9, wherein the data file is received through at least one of a plurality of streams, and wherein each of the plurality of streams comprises multiple copies of an entirety of the data file so that the entirety of the data file is transmitted in a corresponding stream repeatedly and each of the plurality of streams transfers the data file with a different starting offset.

17. The method of claim 9, wherein the data file is received through at least one of a plurality of streams, and wherein each of the plurality of streams comprises multiple copies of an entirety of the data file so that the entirety of the data file is transmitted in a corresponding stream repeatedly and each of the plurality of streams is transmitted on a multiple-user accessible channel.

18. A user equipment (UE) comprising:
an antenna;
a processor connected to the antenna and configured to transmit and receive data through the antenna; and
a non-transitory computer readable medium connected to the processor and having stored thereon instructions, that when executed, cause the processor to:
receive a first configuration communication from a network, the first configuration communication having information regarding a relationship between content of a data file and one or more of a plurality of streams carried in multiple-user accessible channels, wherein the data file is transmitted to a plurality of UEs in the one or more of the plurality of streams; and
receive the data file from the network in the one or more of the plurality of streams and according to parameters in the first configuration communication, wherein a first stream in the one or more of the plurality of streams comprises multiple copies of at least one portion of the data file so that the at least one portion of the data file is transmitted in the first stream repeatedly and the plurality of UEs receive the at least one portion of the data file without the need to synchronize with the first stream; and
wherein the data file is received by the UE at a first time instance that is independent of a second time instance at which another UE can receive the data file.

19. The UE of claim 18, wherein the non-transitory computer readable medium further has stored thereon instructions, that when executed, cause the processor to:
send a request for the data file to the network through the antenna.

20. The UE of claim 19, wherein the non-transitory computer readable medium further has stored thereon instructions, that when executed, cause the processor to:
receive the first configuration communication from the network in response to the request for the data file.

21. The UE of claim 18, wherein the non-transitory computer readable medium further has stored thereon instructions, that when executed, cause the processor to:
process the received data file to determine whether the data file has missing portions.

22. The UE of claim 21, wherein the non-transitory computer readable medium further has stored thereon instructions, that when executed, cause the processor to:
provide feedback to the network regarding the receiving the data file, the feedback comprising, in response to the data file having missing portions, information regarding the missing portions.

23. The UE of claim 18, wherein the instructions for causing the processor to receive the data file from the network in one or more of a plurality of streams comprise instructions for causing the processor, when executed, to perform at least one of:
   receiving the data file through at least one stream of the plurality of streams, wherein each of the plurality of streams repeatedly transfers a segment of the data file;
   receiving the data file through at least one stream of the plurality of streams, wherein each of the plurality of streams repeatedly transfers an entirety of the data file, and wherein each of the plurality of streams transfers the data file with a different starting offset; and
   receiving the data file through at least one of the plurality of streams, wherein each of the plurality of stream repeatedly transfers an entirety of the data file with a different modulation and coding scheme.

24. The UE of claim 18, wherein the non-transitory computer readable medium further has stored thereon instructions, that when executed, cause the processor to:
   receive a second configuration communication in response to the data file having missing portions; and
   receive at least some of the missing portions according to the second configuration communication; and
   wherein at least some of the missing portions are received from the network in one of a unicast transmission and a transmission of the data file on a stream accessible to multiple users.

25. A network element comprising:
   an antenna;
   a processor connected to the antenna and configured to transmit and receive data through the antenna; and
   a non-transitory computer readable medium connected to the processor and having stored thereon instructions, that when executed, cause the processor to:
      transmit a data file through one or more streams to a plurality of user equipments (UEs), wherein each of the one or more streams are carried over a multiple-user accessible channel, wherein a first stream in the one or more streams comprises multiple copies of at least one portion of the data file so that the at least one portion of the data file is transmitted in the first stream repeatedly and the plurality of UEs receive the at least one portion of the data file without the need to synchronize with the first stream; and
      provide first configuration communication to the plurality of UEs regarding a relationship between content of the data file and the one or more streams such that each of the plurality of UEs can receive the data file at different time instances according to the first configuration communication.

26. The network element of claim 25, wherein the non-transitory computer readable medium further has stored thereon instructions, that when executed, cause the processor to
   broadcast availability of the data file.

27. The network element of claim 25, wherein the non-transitory computer readable medium further has stored thereon instructions, that when executed, cause the processor to:
   receive one or more requests from the plurality of UEs for the data file.

28. The network element of claim 25, wherein the non-transitory computer readable medium further has stored thereon instructions, that when executed, cause the processor to:
   receive feedback from a first UE in the plurality of UEs, related to downloading of the data file by the first UE.

29. The network element of claim 28, wherein the non-transitory computer readable medium further has stored thereon instructions, that when executed, cause the processor to:
   transmit a second configuration communication to the first UE of the plurality of UEs in response to the feedback from the first UE indicating that the data file is incomplete; and
   transmit at least some missing portions of the data file to the first UE in one of a unicast transmission and a transmission of the data file on a stream accessible to multiple users.

* * * * *